United States Patent Office 3,523,081
Patented Aug. 4, 1970

3,523,081
HIGH METAL CONTENT ADDITIVES FOR FLUID COMPOSITIONS
Milton Braid, Barrington, N.J., assignor to Mobil Oil Corporation, a corporation of New York
No Drawing. Filed Feb. 1, 1967, Ser. No. 613,135
Int. Cl. C10m 1/48, 3/42; C09k 3/02
U.S. Cl. 252—32.7  20 Claims

ABSTRACT OF THE DISCLOSURE

Polyvalent metal diorganophosphorodithioates or the metal oxide-, hydroxide-, or carbonate-complex thereof are reacted with polyvalent metal carboxylates in the presence of highly aromatic petroleum oils. The reaction produces novel stable complex products having extremely higher metal-to-phosphorus ratios than hitherto obtained.

FIELD OF THE INVENTION

This invention relates to improved complex metal diorganophosphorodithioates and to the method of producing the same.

DESCRIPTION OF THE PRIOR ART

U.S. Pat. No. 3,102,096 and U.S. patent application Ser. No. 555,281, filed on June 6, 1966 and now abandoned, describe metal carboxylate coordinated complexes of diorganophosphorodithioate salts as having decreased corrosiveness to metals, increased solubility, and improved friction and antioxidant properties when used in lubricants and transmission fluids. This improved performance is related to the increased metal content resulting from the introduction or incorporation of the metal carboxylate.

In the aforementioned disclosures, the preparation of the complexes is conducted in the presence of volatile organic solvents, such as benzene, toluene, xylene or the like. These solvents are used for the substantially complete azeotropic removal of water, a necessary step in producing the complexes. Water is ordinarily present in the reaction mixture as a diluent, or as water of hydration of the metal carboxylate reactant or as the product of the neutralization of the metal phosphorodithioate and metal carboxylate. Solvents are also required to thin the reaction mixture and generally to improve the handling of the reactants and products.

On a manufacturing scale, however, use of volatile, flammable solvents requires additional storage vessels, sufficient ventilating and fire-preventive facilities, and, for economic purposes, purification equipment to reclaim solvents. The reaction product, moreover, must still be separated from the organic solvent before it can be used in a final oil formulation, so that an additional distillation step is necessary. In addition to these special equipment costs, the employment of organic solvents does not always lead to stable complexes. Certain complexes produced with difficulty in such solvents may later undergo chemical reorganization during prolonged storage or when subjected to temperature cycling during handling, e.g. shipment. They become nonhomogeneous in their fluid environment and, as a result, may precipitate metal carboxylate, metal carboxylate-metal base or other insoluble substances. Although it has been suggested to substitute diluent oils, such as solvent-refined paraffinic or naphthenic oils, or other types of hydrocarbon solvents as the carrier for the reaction mixture, these substitutes are ineffective because they may limit or prevent entirely the desired complexing of the metal carboxylate. The diluent oils appear to prevent complexing even when xylene or benzene is also present.

A means of producing stable polyvalent metal carboxylate-coordinated salts of phosphorodithioates having high metal-to-phosphorus ratios without resorting to complex manufacturing methods with their consequent economic penalties is highly desirable.

SUMMARY OF THE INVENTION

It has now been found that stable polyvalent metal carboxylate-coordinated polyvalent metal phosphorodithioate salts can be produced with increased metal-to-phosphorus weight ratios by reacting a metal carboxylate with a metal diorganophosphorodithioate or metal oxide complex thereof in the presence of a petroleum hydrocarbon oil boiling within the range of about 480° to about 1000° F. and having an aromatic content of at least about 80%, and preferably at least 90%. It has been found that these petroleum aromatic oils assist in the complexing reaction, stabilize the complex product, and permit the formation of complexes having higher metal-to-phosphorus ratios than previously available.

DESCRIPTION OF SPECIFIC EMBODIMENTS

The preferred coordinated salts of this invention are those in which the metal-to-phosphorus weight ratio is at least 1.5 and most preferably at least 2.0. The zinc carboxylate complexes, such as zinc acetate complexes of the zinc diorganophosphorodithioate, are the most preferred salts. Other metal salts include salts of metals of Groups I–B, II–B, III–A, IV–A, VII–B and VIII of the Periodic Table. Particularly included are iron, cobalt, nickel, copper, aluminum, lead and zinc, as previously noted.

The metal phosphorodithioate reactants employed in this invention are produced by known procedures. Usually they are produced by reacting an aliphatic or aromatic alcohol with a phosphorus sulfide. The resulting acid is neutralized with a polyvalent metal base, such as a metal oxide, hydroxide or carbonate, to produce the neutralized metal salt. Excess metal base may be reacted with the phosphorodithioic acid, thus producing a metal base complex of the phosphorodithioate salt. This metal phosphorodithioate salt is mixed with the polyvalent metal carboxylate at an elevated temperature in the presence of the aromatic mineral oil to produce the coordination product. The metals in the base and the carboxylate need not be the same. The water which may be present is removed during the reaction. As discussed in U.S. Pat. No. 3,102,- 096, the exact nature of the bonding is not completely understood. It is theorized that the product is a Werner-type of complex. As a non-limiting example the structure of a preferred zinc complex may be pictured as

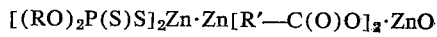

$$[(RO)_2P(S)S]_2Zn \cdot Zn[R'-C(O)O]_2 \cdot ZnO$$

wherein R may be alkyl, alkenyl, cycloalkyl, aryl, alkaryl, aralkyl; and R may also contain non-hydrocarbyl atoms as in the case of alkoxy, aryloxy, alkylthio, arylthio, alkylamino and arylamino groups, R having from about 3 to about 30 carbon atoms; and R' may be hydrogen or alkyl, cycloalkyl, aralkyl, aryl and alkaryl having up to 20 carbon atoms. The presence of ZnO in the structure is preferred although the complexes of this invention are not limited thereto. In addition to the oxide, the hydroxides or carbonates may be used.

The organic groups of the polyvalent metal diorganophosphorodithioates may include alkyl and aralkyl derivatives, such as n-butyl, isobutyl, amyl, hexyl, isohexyl, decyl, dodecyl, octadecyl, oleyl, benzyl and the like; cycloalkyl, such as cyclohexyl; neoalkyl, such as 2,2-dimethyl-1-propyl, 2,2,4-trimethyl-1-pentyl, 2,2-dimethyl-1-decyl, 2,2,4-trimethyl-1-hexadecyl; aryl and alkaryl, such as phenyl, naphthyl, tolyl, t-amyl phenyl, didodecyl phenyl, wax phenyl, nonylphenyl and the like. These organic substitutents of the phosphorodithioic acid may also contain non-hydrocarbyl groups containing atoms of oxygen, sulfur and nitrogen, as indicated in the definitions for R and R', such as methoxybutyl, ethylthiophenyl, or butylaminoethyl. Mixtures of organic groups may be used, including mixtures of isomers and mixed alkyl and aryl groups, and the like.

The polyvalent metal carboxylates include metal salts of aliphatic carboxylic acids, aryl carboxylic acids, and alkyl-substituted aryl carboxylic acids. These acids include, for example, formic acid, acetic acid, propionic acid, butyric acid, stearic acid, oleic acid, linoleic acid, naphthenic acid, benzoic acid, naphthoic and salicylic acid.

The reaction medium essential in this invention is an aromatic mineral oil, particularly an aromatic oil having alkyl side chains longer than methyl, which boils within the range of about 480° to about 1000° F. This oil preferably has an aromatic content of at least about 90%. The oils of this nature are generally evaluated on the basis of the paraffinic fraction content therein. A pure aromatic oil is difficult to produce commercially. By employing thermal or catalytic processes, an aromatic fraction may be built up so that the aromatic nature of the product is clearly evident as seen in the boiling point range. Analysis for the paraffinic fraction is by the known silica gel adsorption method. It is preferred that the paraffinic content by this analysis be no higher than about 8%. Preferred oils may contain less than even 6%. The pour point of these oils is about −20° F. (ASTM D–97), the flash point ranging from about 275° to about 405° F. (ASTM D–92) and the mixed aniline cloud point of from about 75° to about 100° F. (ASTM D–611). In the distillation of these oils the initial boiling point is preferably from 524° to 700° F. and the final boiling point range is from about 700° to about 850° F. Oils of this nature are more fully described in U.S. Pat. No. 3,062,771, issued on Nov. 6, 1962.

The reaction temperature may range from about 45° C. to about 200° C. The water added to the reaction mixture or liberated during or formed in the reaction may be readily removed under reduced pressure as the reaction is completed. The remaining mixture may be simply filtered to remove any insoluble or unreacted substances.

The complex salts of this invention may be used to advantage in lubricant compositions, greases, power transmission fluids, heat exchange fluids, and the like. Base media suitably include mineral oils and synthetic lubricants such as synthetic hydrocarbon fluids, synthetic ester lubricants, i.e. diesters, pentaerythritol esters, silicone fluids, glycol ethers, acetals, and so on. Concentrations of from 0.05% to about 20% by weight have been found to be acceptable.

The following examples serve to illustrate the invention although they are not deemed to be a limitation thereof. Any reference to parts or percent is on a weight basis.

EXAMPLE 1

Preparation of O,O-diisohexylphosphorodithioic acid

Into a suitable reaction vessel was added 2088 grams (20.44 moles) of isohexyl alcohol (which is a mixture of isomeric six-carbon primary alcohols) and the contents were heated at 75° C. During the heating step, 1135 grams (5.11 moles) of phosphorus pentasulfide was added portionwise with stirring. The addition was completed in about 2 hours, while the temperature was held in the range of 75° to 80° C. Heating was continued at 80° C., with stirring, for about 4 to 5 hours until the phosphorus pentasulfide was consumed. The reaction vessel was cooled and the resulting green mobile liquid was filtered off. A yield of 2978 grams (over 99% yield) of crude O,O-diisohexylphosphorodithioic acid was obtained.

Analysis.—Calc'd for $C_{12}H_{27}O_2PS_2$: P, 10.4 percent; NN, 188. Found: P, 9.96 percent; NN, 188.

EXAMPLE 2

The O,O-diisohexylphosphorodithioic acid product of Example 1 (2690 grams, or 9.01 moles) was added dropwise, with agitation, into a reactor containing 550 grams (6.76 moles) of zinc oxide, 1000 ml. of distilled water, and 500 ml. of benzene, at 60° to 65° C. The addition lasted over four hours after which the neutralization and complexing reaction was demed complete. Recovery of the product was accomplished by distilling off the water and benzene.

Analysis: P, 8.74%; S, 18.0%; Zn, 11.6%.

EXAMPLE 3

In this example, an aromatic oil having an initial boiling point of about 524° F. and a final boiling point of about 750° F., a flash point of about 320° F. and an aromatic content of at least about 95% was used.

Into a suitable reactor were added 22.5 grams (0.277 mole) of zinc oxide and 38.7 grams of the aromatic oil in the presence of 100 ml. of water and 2 grams of the product of Example 2. The mixture was held at 60° C. as 102.8 grams (0.344 mole) of the phosphorodithioic acid of Example 1 was added with stirring. The rate of addition was such that hydrogen sulfide was not evolved from the reaction mixture. The addition was complete in ½ hour. The reaction mixture was stirred at 60° C. for an additional ½ hour.

To the resulting reaction mixture was added 61 grams (0.278 mole) of zinc acetate dihydrate and the reaction temperature was raised to 100° to 110° C. Water began to distill off. After 50 ml. of water was collected in about 1 to 2 hours, the temperature was raised to complete the removal of water in vacuo (about 115 ml. total) in from 1 to 2 hours. The final reaction temperature was 140° C. The reaction mixture was cooled and filtered through a diatomaceous earth filter aid; about 146 grams of clear dark amber liquid was obtained.

Analysis: P, 5.66%; S, 11.4%; Zn, 14.8%; Zn:P, 2.61.

EXAMPLE 4

The procedure of Example 3 was followed except that the amount of zinc acetate dihydrate was 40.5 grams (0.184 mole) and the amount of O,O-diisohexylphosphorodithioate was 110 grams (0.368 mole). In the distillation step, 100 ml. of water was collected at between about 100° and 110° C. and the remainder of the water was removed in vacuo at 140° C. The reaction product upon cooling and filtering was a clear dark amber liquid in the amount of 154 grams.

Analysis: P, 5.90%; S, 11.7%; Zn, 13.7%; Zn:P, 2.32.

EXAMPLE 5

Using the same amounts of reactants as in Example 3, a commercial zinc diisohexylphosphorodithioate product was reacted with zinc acetate dihydrate in the presence of 10% of a paraffinic process oil. The commercial product had the following analysis: P, 7.75%; S, 16.3%; Zn, 8.73%; Zn:P, 1.12. After the reaction with the zinc acetate was completed the analysis of the resulting product in complex form was as follows.

Analysis: P, 7.24%; S, 15.3%; Zn, 9.66%; Zn:P, 1.34.

This result wherein the zinc-to-phosphorus ratio is not substantially improved indicates that the presence of the paraffinic oil inhibits or interferes with the complexing reaction. However, when the same commercial product was reacted in the presence of the aromatic oil used in Examples 3 and 4, the analysis of the product of an oil-free base was as follows:

Analysis: P, 7.38%; S, 14.9%; Zn, 19.4%; Zn:P, 2.63.

EVALUATION OF PRODUCT

Lubricating compositions containing a mineral lubricating oil and the reaction products of Examples 3 and 4 were tested in a catalytic oxidation test. In this test a 25 cc. sample of the oil containing the additive is placed in a 200 x 25 mm. test tube containing specimens of iron, copper, aluminum and lead. These metals act either as catalysts for oxidation or represent the metals of construction normally found in engines and transmission systems. Dry air is passed through the sample at a rate of 10 liters per hour for 40 hours. The temperature of the test is maintained at about 325° F. The base oil used is a solvent-refined mineral oil.

Oxidation under the test conditions is deemed to cause the oil and other organic materials present in the oil to become acidic in nature and to thicken beyond efficient lubricating range. The test evaluation therefore measures the change of the neutralization number (NN) of the test sample, the precent increase in kinematic viscosity, the loss of the lead sample and the amount of sludge formed.

The following results were obtained:

| Additive | Conc. of complex, wt. percent | NN change | Percent KV increase at 210° F. | Lead loss, mg. | Sludge |
|---|---|---|---|---|---|
| None | | 20.75 | 271 | 80 | Moderate. |
| Product of— | | | | | |
| Ex. 3 | 1 | 0.80 | 17 | 5 | Trace. |
| | 0.5 | 6.40 | 35 | 13 | Heavy. |
| | 0.25 | 5.35 | 18 | 30 | Do. |
| Ex. 4 | 1 | −0.20 | 7 | 1 | Nil. |
| | 0.5 | 16.40 | 38 | 28 | Heavy. |
| | 0.25 | 10.55 | 124 | 101 | Do. |

The product of Example 3 was tested in a commercial automatic transmission fluid composition. The composition contains about 2% of a basic metal sulfonate detergent and about 2.12% of the complex product of Example 3. The same oxidation test was performed on this composition as described above with the following results:

NN change _____ 3.0
Percent KV increase at 210° F. _____ 22
Sludge _____ Nil

In another oxidation test, a 25 ml. oil sample was blown with air in the presence of iron, copper and lead at a temperature of 300° F. Spot tests were taken over 24 hours to determine if phase separation occurs. This separation means that the sludge formed in the oxidation step has separated from the remainder of the oil composition. The base medium is a solvent-refined mineral oil. When separation occurs the oil composition is said to have reached the point of failure. The oil sample in the presence of about 2.1% of the complex product of Example 3 failed after 238 hours of oxidation.

EXAMPLE 6

Dinonylphenyl phosphorodithioic acid, neutralized with 130% excess zinc oxide, is reacted with zinc acetate dihydrate using the same mole ratios and procedure as in Example 3. The aromatic solvent is a 98% aromatic oil having a flash point of about 320° F. and a KV at 210° F. of 1.76 cs. The resulting zinc acetate-coordinated zinc di(nonylphenyl)phosphorodithioate (complexed with excess zinc oxide) is an excellent additive in lubricating oils and in automatic transmission fluids.

EXAMPLE 7

The procedure of Example 6 is followed except that di-(2,2,4-trimethyl-1-pentyl)phosphorodithioate is used. The resulting zinc acetate-coordinated complex is an excellent additive in lubricating oils.

EXAMPLE 8

Didodecylphosphorodithioic acid is neutralized with 130% excess zinc oxide and reacted with zinc benzoate using the same mole ratios and procedure as in Example 3. The same aromatic oil of that example is also used. The resulting zinc benzoate-coordinated zinc di(dodecyl)phosphorodithioate (complexed with zinc oxide) is an excellent inhibitor in lubricating oils.

It is thus seen that the highly aromatic oils employed in the instant application are excellent reaction media for complexing the metal di(organo)phosphorodithioates with the metal carboxylates. They do not hinder the complexing reaction as do paraffinic or naphthenic mineral oils and they are, however, free of the disadvantages encountered in the use of low boiling more flammable and toxic aromatic solvents and which require larger capacity vessels to hold them. In addition, a higher zinc to phosphorus ratio can be achieved with consequent better additive performance, and, moreover, these compositions remain stable and homogeneous during storage and handling. The reaction product containing the aromatic oil may be readily added to lubricating oils or automatic transmission fluids without further processing or without the need of removing any solvent. These products are compatible with the usual additives used in preparing lubricating oil blends and automatic transmission fluids.

Although the invention has been limited herein by means of certain specific examples and tests, it is not intended that the scope thereof be limited in any way except as in the following claims.

I claim:
1. A method for producing a complex of a polyvalent metal carboxylate-coordinated polyvalent metal diorganophosphorodithioate having a metal-to-phosphorus weight ratio of at least about 1.5 to 2.0 comprising
   reacting a polyvalent metal carboxylate selected from the group consisting of aliphatic carboxylates and aromatic carboxylates having from 1 to about 30 carbon atoms with a polyvalent metal diorganophosphorodithioate, said organo group being selected from the group consisting of alkyl, alkenyl, cycloalkyl, aryl, alkaryl, aralkyl, alkoxy, aryloxy, alkylthio, arylthio, alkylamino, and arylamino and having from 3 to about 30 carbon atoms, wherein the polyvalent metal of each reactant is selected from the group consisting of zinc, iron, cobalt, nickel, copper, aluminum and lead;
   in the presence of an aromatic mineral oil having an aromatic content of at least 80% by weight and a boiling point within the range of 480° to about 1000° F., said reaction being carried out at a temperature below the boiling point of the said aromatic mineral oil;
   the reactants being present in amounts sufficient to provide the said metal-to-phosphorus weight ratio of 1.5 to 2.0.
2. The method of claim 1 wherein the aromatic content is at least about 90%.
3. The method of claim 1 wherein the aromatic hydrocarbon oil has a paraffin content of less than about 8%.
4. The method of claim 1 wherein the complex is selected from the group consisting of a metal carboxylate complex and a metal carboxylate-metal base complex of a metal dialkylphosphorodithioate.
5. The method of claim 4 wherein the metal base is zinc oxide.
6. The method of claim 4 wherein the zinc dialkylphosphorodithioate is a zinc dihexylphosphorodithioate.
7. The method of claim 1 wherein the zinc diorganophosphorodithioate is a zinc diarylphosphorodithioate.
8. The method of claim 1 wherein the metal to phosphorus weight ratio is at least about 2.0.
9. A composition consisting essentially of the polyvalent metal carboxylate-coordinated polyvalent metal diorganophosphorodithioate complex prepared according to the method of claim 1 and the said aromatic mineral oil.
10. The composition of claim 9 wherein the aromatic hydrocarbon oil is an alkyl-substituted aromatic hydrocarbon oil having an aromatic content of at least 90%.
11. The composition of claim 9 wherein the aromatic hydrocarbon oil has a paraffinic content of less than about 8%.

12. The composition of claim 9 wherein the metal carboxylate is a zinc carboxylate.

13. The composition of claim 12 wherein the zinc carboxylate is selected from the group consisting of zinc acetate and zinc benzoate.

14. The composition of claim 9 wherein the metal diorganophosphorodithioate is a metal dialkylphosphorodithioate having from 3 to about 30 carbon atoms per alkyl groups.

15. The composition of claim 14 wherein the metal dialkylphosphorodithioate is prepared from a dialkylphosphorodithioate acid and metal base, said metal base being used in amount in excess of the stoichiometric balance.

16. The composition of claim 9 wherein the metal diorganophosphorodithioate is a metal diarylphosphorodithioate having up to about 30 carbon atoms per aryl group.

17. The composition of claim 9 wherein there is also present a major amount of a lubricating oil selected from the group consisting of mineral oils and synthetic oils.

18. The composition of claim 17 wherein the lubricating oil is a solvent-refined mineral oil.

19. The method of claim 1 wherein the said complex salt is the zinc acetate-coordinated complex of zinc diorganophosphorodithioate.

20. The composition of claim 14 wherein the said complex salt is the zinc acetate complex of zinc diisohexylphosphorodithioate.

References Cited

UNITED STATES PATENTS

| | | | |
|---|---|---|---|
| 3,102,096 | 12/1960 | Nygaard | 252—32.7 |
| 3,328,335 | 8/1964 | Jolie | 252—32.7 |
| 3,321,399 | 10/1961 | Versteeg | 252—32.7 |

DANIEL E. WYMAN, Primary Examiner

I. VAUGHN, Assistant Examiner

U.S. Cl. X.R.

252—75, 400